United States Patent [19]

Lee

[11] Patent Number: 4,902,574
[45] Date of Patent: Feb. 20, 1990

[54] METHODS OF USING FLUOROEPOXY COMPOUNDS AS ADHESIVES FOR FLUOROPLASTIC ADHERENDS AND PRODUCTS MADE THEREFROM

[75] Inventor: Sheng Y. Lee, Silver Spring, Md.

[73] Assignee: The United States of America as represented by the Administrator of the National Aeronautics and Space Administration, Washington, D.C.

[21] Appl. No.: 108,238

[22] Filed: Oct. 14, 1987

[51] Int. Cl.[4] .......................... B05D 5/10; B32B 27/08; B32B 27/26; B32B 27/38
[52] U.S. Cl. ................................ 428/422; 427/207.1; 428/413; 428/414
[58] Field of Search ....................... 428/414, 413, 422; 427/386, 207.1

[56] References Cited

U.S. PATENT DOCUMENTS

| | | | |
|---|---|---|---|
| 3,799,832 | 3/1974 | Reick | 428/414 |
| 3,879,430 | 4/1975 | O'Rear et al. | 564/417 |
| 4,343,861 | 8/1982 | Stivers | 428/414 |
| 4,469,724 | 8/1984 | Klinger | 427/163 |
| 4,567,073 | 1/1986 | Larson et al. | 428/422 |

*Primary Examiner*—Allan M. Lieberman
*Attorney, Agent, or Firm*—R. Dennis Marchant; John R. Manning; Ronald F. Sandler

[57] ABSTRACT

Fluoroepoxy compounds are made by reacting a fluoroepoxy resin with an effective curing agent, such as an adduct amine, and, while the compound is sufficiently liquid to wet a fluoroplastic surface, it may be applied to a fluoroplastic adherend, such as a Teflon, to be employed as an adhesive, to form various fluoroplastic products, without requiring any surface treatment of the adherend. The compounds are intentionally formulated with high fluorine contents, normally above 46% by weight, preferably for bonding fluoroplastics with a high F-content, above 55% by weight.

13 Claims, No Drawings

METHODS OF USING FLUOROEPOXY COMPOUNDS AS ADHESIVES FOR FLUOROPLASTIC ADHERENDS AND PRODUCTS MADE THEREFROM

ORIGIN OF THE INVENTION

The invention described herein was made by an employee of the U.S. Government, and may be manufactured and used by or for the Government for governmental purposes without the payment of any royalties thereon or therefor.

TECHNICAL FIELD

This invention pertains to fluoroepoxy compounds and, more particularly, to methods of using fluoroepoxy compounds as adhesives for bonding fluoroplastics and fluoroplastic products made with fluoroepoxy compound adhesives.

BACKGROUND ART

Numerous fluoroplastics such as TEFLON, e.g., PTFE, and PFA, have been widely used for coatings, electrical insulation and as structural components due to their superior properties in the areas of hydrophobicity, chemical and thermal stability and electrical insulation. While these materials have grown in popularity, presently adhesive bonding problems are often encountered when attempting to bond these fluoroplastic materials to surfaces of other bodies.

Fluoroplastics are insoluble, nonpolar, and have low surface energy. These unique properties, which are beneficial for many applications, make the material surface generally non-wettable, and consequently generally non-bondable in the untreated surface condition. Because TEFLON and other fluoroplastics are noted for their chemical inertness, some special and strong methods have been required for surface treatment. Plasma surface treatment has been attempted, but its effectiveness is minimal and unreliable. The present conventional surface treatment for TEFLON involves the use of a chemical etching agent, prior to the application of an adhesive, which contains a sodium-naphthalene complex. The agent is corrosive and may be hazardous in use. Accordingly, in many applications, the use of such an agent is undesirable or impracticable. The required etching action has to be drastic enough to convert the TEFLON surface from nonpolar to polar. After such a conversion, the etched surface layer is so much different from the bulk of the polymer that the molecular bond of the etched layer to the bulk of the polymer is significantly weakened. This weak bondline is subject to moisture penetration and layer separation when bonded with an adhesive, without regard to any superior characteristics of the adhesive employed. In any event, the extent and nature of the etch is critical in terms of the initial initial bond strength. The etched surface is sensitive to moisture, oxygen and UV light, and the bond strength may significantly deteriorate over a period of time with environmental exposure.

STATEMENT OF THE INVENTION

Accordingly, it is an object of the invention to provide an improved process for bonding fluoroplastic materials, without any surface treatment of the materials, using fluoroepoxy adhesives.

It is another object of the invention to provide an etch-free process for bonding fluoroplastic materials using fluoroepoxy adhesives.

It is yet another object of the invention to provide a process for bonding fluoroplastic materials, the resulting bond of which is substantially unaffected by humidity, oxygen or UV light.

It is still another object of the invention to provide a fluoroplastic product bound with a fluoroepoxy adhesive.

Briefly, these and other objects are achieved by providing a fluoroepoxy compound adhesive made by reacting a fluoroepoxy resin with an effective curing agent and applying the compound, while sufficiently liquid to wet a fluoroplastic surface, to the surface of a fluoroplastic adherend in an area intended to form a bondline between the adherend and another object, and thereafter, allowing the adhesive to cure. The resulting fluoroplastic product will have an effective adhesive bond without any surface treatment of the adherend.

DETAILED DESCRIPTION OF THE INVENTION

The invention involves a unique use of fluoroepoxy compounds functioning as adhesives to bond TEFLON and other fluoroplastic adherends to other bodies without requiring any surface treatment. While epoxy adhesives are common and versatile, it has been found that only fluoroepoxy compounds can effectively bond TEFLON or other fluoroplastic materials without any surface treatment. Examples of such compounds include fluoroepoxy compounds made, for example, from the following class, I, of fluorodiepoxide resins:

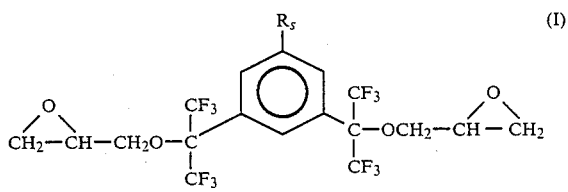

which may be cured by a curing agent including a class II, of adduct amines with the formula:

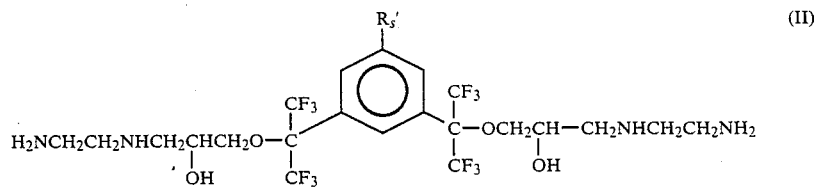

Both of these compounds were developed at the U.S. Naval Research Laboratory. This class of adduct amines may be readily prepared by the known method of reacting a diepoxide with an excess of a diamine. In this case, the process includes reacting a $C_n$-fluorodiepoxide with an excess of ethylenediamine. The methods of making these compounds are well known and have recently been set forth in a journal article,, Lee & Griffith, "Fluoroepoxy Resin for Moisture Vapor Barrier Coating and Other Applications," *Industrial and Engineering Chemistry (I&EC) Product Research and Development,* Vol. 25, No. 4 (December 1986), 572 to 577, a publication of the American Chemical Society.

The fluorine content of these fluoroepoxy compounds varies with the size of the perfluoroalkyl groups, $R_f$ and $R_f'$, but is at least 41% in terms of weight.

The short form designation of the fluorodiepoxide resins, $C_n$-fluorodiepoxide, may be understood from the general fluorodiepoxide formula, I, in which $R_f$ represents $C_nF_{2n+1}$. When $R_f$ equals $C_8F_{17}$, the designation is $C_8$-fluorodiepoxide and when $R_f$ equals $C_6F_{13}$, the designation is $C_6$-fluorodiepoxide.

When the perfluoroalkyl groups, $R_f$ and $R_f'$, are both $C_3F_7$ or larger, the fluorine content of the compound, by weight, will be over 50%. Tests indicate that it is the high fluorine content which enables the compound to significantly wet TEFLON and other fluoroplastics and promote an adhesive bond without any surface treatment. Adhesive tensile strength tests have been made to compare the use of these fluoroepoxy compounds as adhesives with a conventional epoxy adhesive compound, Epon 828 resin/Versamid 140 curing agent, which has been widely used to bond plastics, including fluoroplastics, after etching. The following are some specific, representative examples of these tests.

EXAMPLE NO. 1

Aluminum rod adherends were etched with a chromic acid solution according to the ASTM method. A fluoroepoxy adhesive compound with a fluorine content of 56.4% was formulated stoichiometrically with $C_8$-fluorodiepoxide resin and $C_6$-adduct amine curing agent and was applied to two adherend rods, to form a bondline between their ends, and the compound was allowed to cure. At the same time, an epoxy adhesive compound, Epon 828 resin/Versamid 140 curing agent, was applied to form a bondline between two other adherend rod ends and this compound was allowed to cure. The tensile strength of the fluoroepoxy bond was determined to be 3470±330 psi with adhesive failure while the tensile strength for the Epon 828/Versamid 140 epoxy adhesive bond was 7030±258 psi with both adhesive and cohesive failure.

EXAMPLE NO. 2

Teflon PTFE rod adherends were etched according to current conventional practice with a sodium-naphthalene complex solution and the conventional Epon 828/Versamid 140 adhesive was employed as set forth in Example No. 1. The tensile strength of the bond was determined to be 912±180 psi. All failures were by the separation of the etched surface layer. The nature and extent of the etch was critical and caused the large deviation in the observed tensile strengths.

EXAMPLE NO. 3

Teflon PTFE rod adherends were provided without any etching or other surface preparation. Tensile strength tests were made using both the fluoroepoxy compound and the conventional Epon 828/Versamid 140 adhesives employed in Example No. 1. The adhesive tensile strengths obtained with fluoroepoxy bonding were 640±48 psi and those obtained with conventional epoxy bonding were 330±16 psi. In both situations, there were adhesive failures.

These test results clearly show the difficulty of bonding Teflon. With both the fluoroepoxy and the conventional adhesives, the Teflon bonding strengths were small compared to the aluminum bonding strengths. Nevertheless, the superiority of the fluoroepoxy adhesive in bonding Teflon is demonstrated by the fact that its bonding strength, without any surface etching or other surface preparation, is twice that achieved by the conventional adhesive. While etching with the sodium-naphalene complex solution did improve the bonding of Teflon with the conventional adhesive, the improvement was found to vary greatly from one specimen to another due to the difficulty in producing a uniform and ideal etch. Comparatively, the fluoroepoxy adhesive bonding, without any surface etching, gave as high as 70% of the bond strength achieved with the special chemical etching. The average bond strength with the etching was calculated with data with a large standard deviation of the average strength value. This indicates that a lack of predictability may be a substantial problem when the conventional process, with etching, is relied on.

Fluoroepoxy compounds formulated with the above-identified fluoroepoxy resins and adduct amines are just one example of a class of fluoroepoxy compounds which can function as adhesives for Teflon. The above-identified fluoroepoxy resins can be cured with other fluorinated curing agents and other fluoroepoxy resins can be employed. There is no requirement whatsoever that a particular fluoroepoxy resin be cured with its adduct amine. It is only essential that the fluorine content of the various fluoroepoxy adhesive compounds be kept high to avoid the necessity of a surface treatment of the Teflon or other fluoroplastics prior to bonding.

As noted, a high fluorine content for the fluoroepoxy adhesive compound is required to enable the compound to significantly wet Teflon and other fluoroplastics and to achieve an adhesive bond without any surface treatment. Further tests, beyond that described in Examples Nos. 1 through 3, were made to define the fluorine content of the fluoroepoxy compounds necessary for bonding Teflon PTFE. The results are shown in the following Table I.

TABLE I

Tensile Strengths of Fluoroepoxy Adhesive Bonding of TEFLON/PTFE Rods Without Any Surface Treatment (ASTM D2095)

| Fluoroepoxy Resin | Fluorine Content (%) of Adhesive Compound | Tensile Strengths (psi) |
|---|---|---|
| $C_8$-fluorodiepoxide | 56.4 | 650 ± 46 |
| $C_6$-fluorodiepoxide | 54.6 | 601 ± 87 |
| $C_6/C_0$-fluorodiepoxide | 50.2 | 567 ± 163 |
| $C_6/C_0$-fluorodiepoxide | 46.9 | 610 ± 55 |
| $C_6/C_0$-fluorodiepoxide | 46.7 | 590 ± 78 |
| $C_0$-fluorodiepoxide | 45.9 | 358 ± 51 |

All these tests employed the previously described $C_6$-adduct amine curing agent in stoichiometric amounts with the fluoroepoxy resins. The fluoroepoxy resins vary, as indicated in the left column of the table, from $C_0$-fluorodiepoxide to $C_6$- and $C_8$-fluorodiepoxide where $R_f$ is equal to H, $C_6F_{13}$, and $C_8F_{17}$, respectively. Blends of $C_0$- and $C_6$-fluorodiepoxide resins in appropriate ratios were used to prepare adhesive compunds with fluorine (f) contents ranging from 50.2% to 46.7%, as shown in the middle column.

The adhesive tensile strengths obtained indicate a trend that the strength decreases with decreasing F-content of the fluoroepoxy adhesives in bonding Teflon PTFE. When the F-content goes down to below 46%, the bonding strength drops to a level which is only slightly higher than that which is achievable with the conventional Epon 828/V140 adhesive compound without any surface treatment of the adherends. Evidently, a minimum of 46% F-content is needed in order to achieve an advantageous bonding strength in bonding Teflon PTFE, which has the highest F-content of all the fluoroplastics, namely 76%.

Further testing was undertaken to demonstrate that the F-content of the fluoroepoxy adhesive compound was not as critical, in terms of allowing the compound to wet, when the adherend fluoroplastics themselves contain a significantly lower F-content than Teflon PTFE.

For this purpose, Dupont Tefzel, which is a copolymer of ethylene and tetrofluoroethylene, was selected as a fluoroplastic adherend. The Tefzel sample used for the testing is essentially composed of $CH_2CH_2$ and $CF_2CF_2$ in about an equal molar ratio and has an F-content of 54.4%. The results of these tests are shown in the following Table II:

the high F-content fluoroplastics, e.g., 55% and higher, that substantial advantages can be obtained.

These tests also demonstrate that the curing agent used in formulating the adhesive compound is not limited to the adduct amines. It must, however, be generally compatible with the fluoroepoxy resins employed. Such agents are rare in the state-of-the-art market and, for that reason, the $C_6$-adduct amine has been employed most often. In these tests, one of the curing agents employed in the adhesive compound formulation was OFOM (3,3,4,4,5,5,6,6-octafluorooctamethylenediamine). As shown in Table II, a fluoroepoxy adhesive compound which is formulated with OFOM can bond TeflOn PTEE, a high F-content fluoroplastic, without any surface treatment. The resulting bond strength is comparable with that obtained with fluoroepoxy resins cured with the $C_6$-adduct amine alone. Further, the bond strength could be improved if the formulation is optimized.

For the purposes of the inventive process and products made therefrom it is unimportant what physical form the fluoroepoxy resin and its curing agent take. One or both of these fluoroepoxy adhesive compound components may initially be solids. Often both are initially solids in the production of large area laminates and heat and/or pressure must be applied to have these components react together. It is only important that the

TABLE II

Tensile Strength of Fluoroepoxy Adhesive Bonding of Fluoroplastic Rod Specimens Without Any Surface Treatment

| Adherend/ Adherend Fluorine Content | Adhesive Compounds* | Fluorine Content (%) Of Adhesive Compound | Tensile Strengths (psi) | Remarks |
|---|---|---|---|---|
| TEFZEL/54.4% | GFE-AD648 | 56.4 | 573 ± 160 | |
| | GFE-OFOM-07 | 46.7 | 586 ± 188 | |
| | GFE-Adh-10 | 46.7 | 567 ± 200 | |
| | EPON 828/V140 | 0 | 743 ± 142 | 50/50 by wgt. |
| PTFE/76% | GFE-OFOM-08 | 57.2 | 577 ± 115 | The formulation has not been optimized. |

*See Table III for components in terms of weight ratios.

TABLE III

| | Formulation of the Fluoroexpoxy Adhesive Compounds | | | |
|---|---|---|---|---|
| Chemical Components | GFE-AD648 | GFE-OFOM-07 | GFE-Adh-10 | GFE-OFOM-08 |
| | (Component Weights in the Compound) | | | |
| $C_0$-fluorodiepoxide | — | 89.11 | 89.11 | — |
| $C_6$-fluorodiepoxide | — | 10.89 | 10.89 | — |
| $C_8$-fluorodiepoxide | 100.00 | — | — | 100.00 |
| $C_6$-adduct amine | 34.04 | 23.80 | 58.77 | 11.78 |
| OFOM | — | 15.74 | — | 10.01 |

The test results clearly show that the bonding strengths obtained with the lower F-content Tefzel adherend, with, in turn, a variation of the F-content of the fluoroepoxy adhesives from 56.4% down to 46.7%, are about the same, i.e., the adhesive F-content is not critical as it is with the higher F-content adherends. Moreover, the test results indicate the fluoroepoxy adhesives, as a group, did not achieve as good a bond with the Tefzel as the conventional epoxy adhesive, i.e., the Epon 828/V140, that contains no fluorine. Thus, while fluoroepoxy adhesives can achieve significant bonding strengths with low F-content fluoroplastics, it is with fluoroepoxy compound be sufficiently liquid or flowable to wet the surface of a fluoroplastic adherend at some time in the process to have the compound act as an adhesive capable of effective bonding to the fluorplastic adherend.

I claim:

1. A method of preparing a fluoroplastic adherend for adhesion to another body, including:
   reacting a fluorodiepoxide resin with an effective curing agent for said resin in approximately stoichiometric amounts to form a fluorodiepoxide adhesive compound, said compound having a fluorine content of at least 41% by weight;

applying said compound, while it is sufficiently liquid to wet a fluoroplastic surface, to said fluoroplastic adherend so that said adhesive compound may be allowed to cure after contacting the coated surface of said fluoroplastic adherend with said another body.

2. The method of claim 1 wherein said curing agent is an adduct amine of said fluorodiepoxide resin.

3. The method of claim 1 wherein said fluorodiepoxide adhesive compound has a fluorine content, by weight, of about 46%, or higher.

4. The method of claim 1 wherein said fluoroplastic adherend has a fluorine content, by weight, of about 55%, or higher.

5. The method of claim 1 wherein said fluorodiepoxide resin is a member of a class of fluorodiepoxides having the formula:

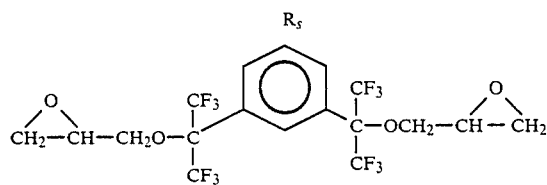

wherein $R_f$ represents the perfluoroalkyl group $C_nF_{2n+1}$.

6. The method of claim 2 wherein said adduct amine of said fluorodiepoxide is a member of a class of adduct amines having the formula:

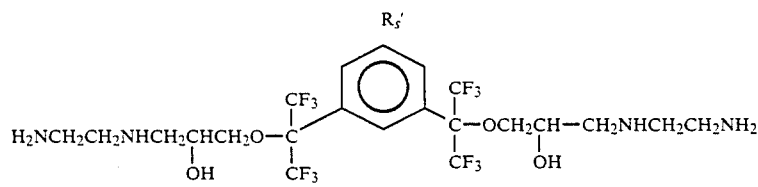

wherein $R_f'$ is a perfluoroalkyl group.

7. A product including:
a fluoroplastic body and a cured fluorodiepoxide adhesive compound in immediate contact and forming a bondline with a surface portion of said fluoroplastic body, said compound having a fluorine content of at least 41% by weight.

8. The product of claim 7 wherein said fluorodiepoxide adhesive compound includes a mixture of a fluorodiepoxide resin and an effective curing agent for said resin in approximately stoichiometric amounts, said compound having a fluorine content, by weight, of about 46%, or higher.

9. The product of claim 7 wherein said fluoroplastic body has a fluorine content, by weight, of about 55%, or higher.

10. The product of claim 8 wherein said fluoroplastic body has a fluorine content, by weight, of about 55%, or higher.

11. The product of claim 8 wherein said curing agent is an adduct amine of a fluorodiepoxide.

12. The product of claim 11 wherein said fluoride epoxide is a member of a class of fluorodiepoxides having the formula:

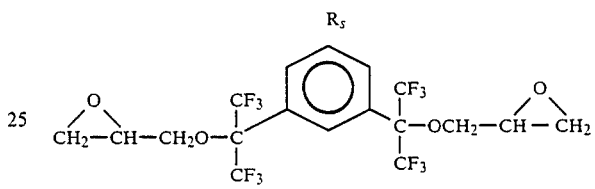

and said adduct amine of said fluorodiepoxide is a member of a class of adduct amines having the formula:

wherein $R_f$ and $R_f'$ are perfluoroalkyl groups with $R_f$ representing $C_nF_{2n+1}$.

13. The product of claim 7 wherein said fluorodiepoxide adhesive compound has a fluorine content, by weight, of 46%, or higher.

* * * * *